B. FORD.
FISHING GEAR.
APPLICATION FILED JUNE 4, 1910.
1,002,981.
Patented Sept. 12, 1911.
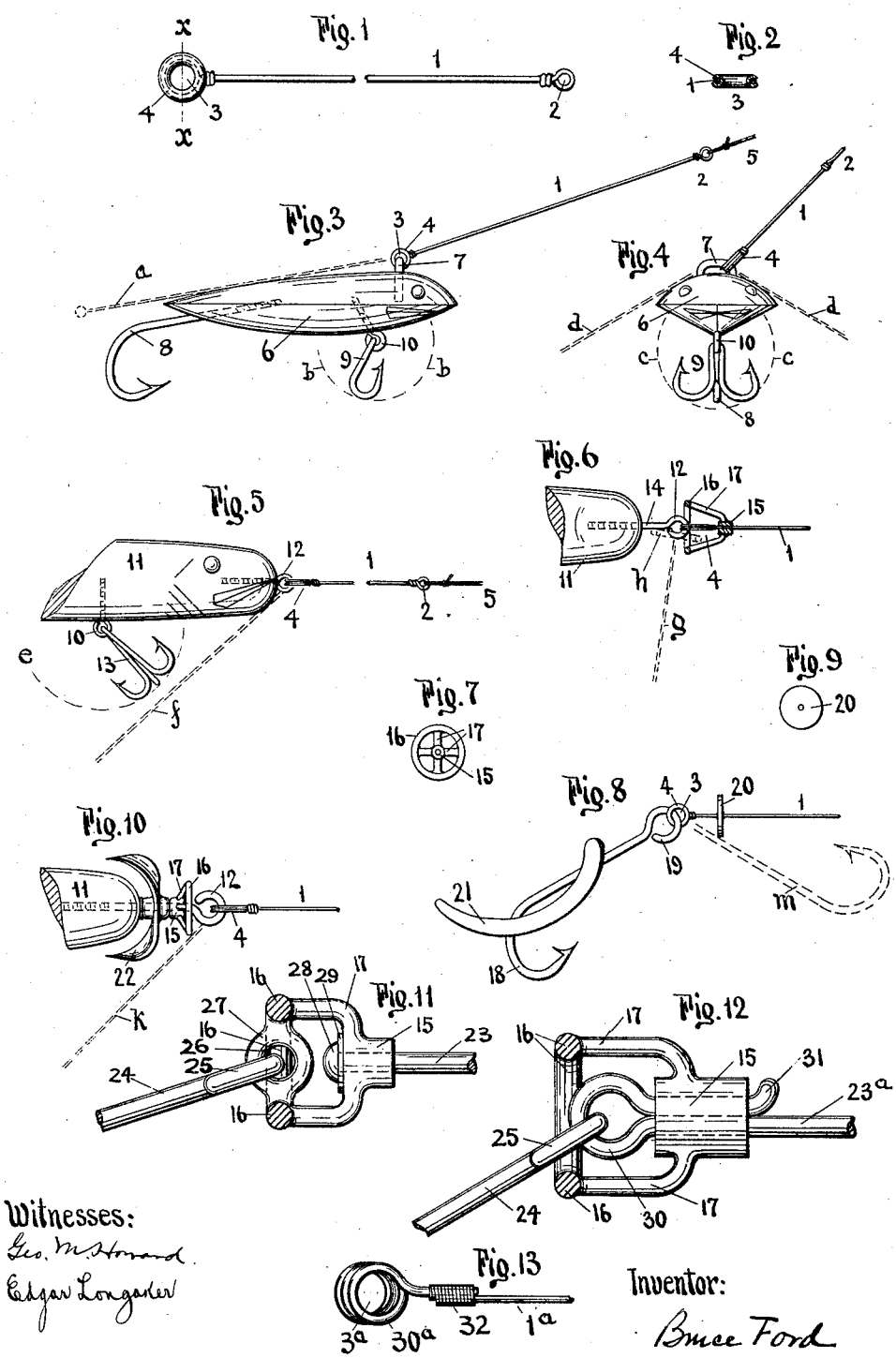
Witnesses:
Geo. M. Howard
Edgar Longader
Inventor:
Bruce Ford

UNITED STATES PATENT OFFICE.

BRUCE FORD, OF PHILADELPHIA, PENNSYLVANIA.

FISHING-GEAR.

1,002,981.     Specification of Letters Patent.     Patented Sept. 12, 1911.

Application filed June 4, 1910. Serial No. 564,943.

*To all whom it may concern:*

Be it known that I, BRUCE FORD, a citizen of the United States, residing at Philadelphia, in the county of Philadelphia and State of Pennsylvania, have invented certain new and useful Improvements in Fishing-Gears, of which the following is a specification.

This invention relates to fishing gears comprising a lure or hook member with means for attaching a fishing line thereto, and its object is to provide means for preventing the entanglement of the line upon the fish hook or hooks, or other projecting points upon the lure member.

In carrying out this invention I provide a trace or leader of relatively rigid material interposed between the line terminal and the line attaching means of the lure member, flexibly connected at the latter part, but limited in range in order that the line is at all times maintained free from parts of the lure member upon which it might otherwise become entangled.

Further features of the invention will appear by referring to the accompanying drawings in which—

Figure 1 is an elevational view of a trace or leader of novel construction particularly adapted for use in connection with the present invention; Fig. 2 is a sectional view taken on the line *x—x* of Fig. 1. Figs. 3 and 4 are side and end elevations respectively of a bait or lure, of the kind described in my application for Letters Patent filed March 3, 1910, Serial Number 547,024, with the present invention applied thereto. Fig. 5 is a side elevation illustrating the application of the invention to another form of bait or lure. Fig. 6 is a similar view showing the use of a guard mounted upon the trace to limit its motion in relation to the lure member. Fig. 7 is an end view of the guard used in the construction shown in Fig. 6. Fig. 8 is a side elevation showing the limiting of the relative motion of trace and lure members by means of another form of guard, Fig. 9 showing an end view of the guard. Fig. 10 is a side elevation showing a portion of a lure member and trace, a guard similar to that shown in Figs. 6 and 7 being applied to the lure member. Figs. 11 and 12 are enlarged elevational views, partly in section, showing different forms of guarded connections between trace and lure member. Fig. 13 is a perspective view of one end of a trace member showing a modified form of loop for attachment to the lure member.

In Figs. 1 and 2, 1 is a trace or leader of single or stranded wire or other suitable material; while it may possess a certain amount of flexibility it should possess a relative amount of rigidity in order to function, as will later appear. One end terminates in a loop or eye 2, for attachment to the line terminal, its other end terminating in a loop or eye 3, for attachment to a bait or lure member. The trace 1 should be made of a caliber as small as possible consistent with strength. I have found, however, that a small wire will soon wear through at the point where it is joined to the lure member, and to overcome this weakness the loop 3 is reinforced by the thimble, gromet, or eyelet 4, as shown.

In Figs. 3 and 4, the line 5 is tied directly to the loop 2 of the trace 1, although the line 5 may be connected to the loop 2 by a swivel or other familiar form of connection. The eye 3, of the trace, engages the staple 7 mounted upon the body-portion 6 of the lure member which is supplied with a tail hook 8, whose shank is threaded into the body-portion 6, and the cluster hook 9 secured to the body-portion by means of the screw eye 10. While the hooks 8 and 9 are mounted upon the belly or bottom side of the body-portion 6, the trace 1 is attached by the staple 7 to the back or top side. The range of travel of the fish-hook 9 is indicated by the dotted lines *b* and *c*. While the trace 1 may lie tangentially upon the surface of the body-portion 6, as indicated by the dotted lines *a, d, d*, it is prevented by the surface of the body-portion from coming within the range of the points of the fish-hooks, the trace 1 being sufficiently rigid to allow this result to be accomplished. The trace 1 is of sufficient length to maintain the line 5 beyond the range of the points of the fish hooks, even when the lure is jerked around erratically as in the act of casting.

In Fig. 5, 11 is the front portion of the body-portion of a bait or lure having cluster fish-hooks 13 attached by the screw eye 10. The trace 1 is attached to the forward end or nose of the body-portion 11, by the screw eye 12. The path in which the hook 13 may swing is indicated by the dotted line e, and the hook 13 is placed sufficiently toward the rear of the body-portion to keep the points of the fish-hook from interfering with the line 5 or trace 1, even though the latter may lie tangentially upon the body-portion as indicated by the dotted line f. Obviously the screw eye 12 may be let into a countersunk hole in the body portion 11, to further restrict the range of motion of the trace 1 in relation to the body-portion 11.

In Fig. 6, the shank 14, of the screw eye 12, extends outward from the body portion 11, and a guard, comprising the transversely disposed ring 16 mounted by the spokes 17 upon the hub 15 soldered or otherwise secured to the trace 1, is provided to limit the relative motion of the lure member and trace member. When the trace 1 assumes the position indicated by the dotted line g, the transverse ring 16 assumes the position indicated by the dotted line h, its rim engaging the shank 14 to prevent the trace 1 and body-portion 11 from getting any closer together. In Fig. 6, the hub 15 and the ring 16 are shown in section, an end view of these parts and the spokes 17 being shown in Fig. 7.

In Fig. 8, the lure member comprises the hook 18 provided with a piece of pork rind or other bait or lure 21. The shank of the fish-hook terminates in the closed hook 19 engaging the eye 3 of the trace 1. The disk 20, an end view of which is shown in Fig. 9, is soldered or otherwise fastened transversely on the trace 1, its rim engaging upon the shank of the fish-hook 18 serving to keep it from entangling the trace 1, as indicated by the dotted line m.

In Fig. 10, the body-portion 11 is provided with a spinner 22, mounted upon the shank of the screw eye 12, and whose points are prevented from engaging the line or trace 1 by the guard, 16, 17, 15, already described in connection with Figs. 6 and 7, but in this example mounted upon the shank of the screw eye 12 to limit the extent of the travel of the trace 1 in respect to the body portion 11 to the position indicated by the dotted line k.

In Fig. 11, the guard, 16, 17, 15 is provided with a cross piece 27 extending diametrically across the ring 16, to which it is secured, and provided with a hole 26 into which is looped the terminal eye 25 of the relatively rigid member 24. The relatively rigid member 23 passes through the hub 15 and is provided with a head 28 and washer 29. The member 23 may be made free to turn in the hub 15 to act as a swivel. The relative motion of the parts 23 and 24 is limited by the part 24 and the ring 16 coming together. The part 24 may be a trace member, in which case the part 23 would be part of a lure member; or the part 24 may be the lure member, in which case the part 23 would be a trace member.

Fig. 12 shows a detachable connection between the two relatively rigid members 24 and 23ª. In this construction, the member 23ª passes through the hub 15, is formed into the loop 30 for engaging the eye 25, and is then passed back through the hub 15, and the free end 31 is bent outward to maintain the position of the parts. By bending down the free end 31 against the member 23ª, the hub 15 can be slipped back over the end 31, and the parts separated. The contact of the member 24 with the ring 16 limits the relative motion of the connection as already described.

Fig. 13 shows another form of loop for the lure end of a trace, to enable ready attachment and detachment. 1ª is the trace proper, 3ª being the loop, preferably of heavier material, 30ª, than that of the trace 1ª. The loop 3ª is made by coiling the wire 30ª in the form of a spring helix which may then be attached to the lure member after the manner of a key ring. The wire 30ª is attached to the trace 1ª preferably by lapping the two and binding with fine wire, as shown at 32, and the joint may then be soldered.

Obviously other modifications can be made without departing from the spirit of my invention; for example a cup or a ball could be substituted for the ring and disk forms of guard selected for illustration; but, while the examples selected are the forms preferred, it is to be understood that my invention is not limited to the precise forms shown and described.

The features of monopoly to be secured by Letters Patent are set forth in the following claims:

1. A fishing gear comprising, in combination, a lure member having projecting points thereon, draft means for the lure member, a substantially rigid trace having line attaching means at one of its ends, a flexible joint for connecting said draft means to the other end of the trace, and means for limiting the extent of the action of the flexible joint to maintain the line and trace out of the range of said projecting points.

2. A fishing gear comprising, in combination, a lure member having projecting points thereon, draft means for the lure member, a substantially rigid trace having line attaching means at one of its ends, a flexible joint for connecting said draft means to the other end of the trace, and a rim arranged transversely to the flexible joint to maintain the line and trace out of the range of said projecting points.

3. A fishing trace comprising, in combination, a substantially rigid longitudinal member, line attaching means at one of its ends, lure attaching means at its other end, and a rim carried by the trace near and transversely to the lure attaching means, substantially as, and for the purpose, set forth.

BRUCE FORD.

Witnesses:
GEO. M. HOWARD,
WM. C. DU BOIS.

Copies of this patent may be obtained for five cents each, by addressing the "Commissioner of Patents, Washington, D. C."